(12) United States Patent
Ogawa et al.

(10) Patent No.: US 7,836,774 B2
(45) Date of Patent: Nov. 23, 2010

(54) STRAIN DETECTOR HAVING A COLUMN-SHAPED STRAIN GENERATOR

(75) Inventors: Takaaki Ogawa, Fukui (JP); Yasunobu Kobayashi, Fukui (JP); Yasunori Matsukawa, Fukui (JP); Toshirou Otobe, Fukui (JP); Katsuhiko Omoto, Fukui (JP); Noriyuki Jitousho, Osaka (JP); Akira Matsuura, Osaka (JP)

(73) Assignee: Panasonic Corporation, Osaka (JP)

( * ) Notice: Subject to any disclaimer, the term of this patent is extended or adjusted under 35 U.S.C. 154(b) by 347 days.

(21) Appl. No.: 11/914,882

(22) PCT Filed: May 17, 2006

(86) PCT No.: PCT/JP2006/309845

§ 371 (c)(1),
(2), (4) Date: Nov. 19, 2007

(87) PCT Pub. No.: WO2006/123708

PCT Pub. Date: Nov. 23, 2006

(65) Prior Publication Data

US 2009/0049930 A1    Feb. 26, 2009

(30) Foreign Application Priority Data

| May 19, 2005 | (JP) | 2005-146267 |
| May 19, 2005 | (JP) | 2005-146268 |
| Mar. 9, 2006 | (JP) | 2006-063873 |
| Mar. 9, 2006 | (JP) | 2006-063874 |
| Mar. 9, 2006 | (JP) | 2006-063878 |
| Apr. 20, 2006 | (JP) | 2006-116429 |

(51) Int. Cl.
*F16B 31/02* (2006.01)
(52) U.S. Cl. ............................................. 73/761; 73/769
(58) Field of Classification Search ................. None
See application file for complete search history.

(56) References Cited

U.S. PATENT DOCUMENTS 2,638,335 A * 5/1953 Kammer et al. .......... 73/514.33
4,553,124 A * 11/1985 Malicki ........................ 338/5

(Continued)

FOREIGN PATENT DOCUMENTS

EP            522280 A1 *  1/1993

(Continued)

OTHER PUBLICATIONS

International Search Report issued Jul. 25, 2006 in the International Application No. PCT/JP2006/309845.

*Primary Examiner*—Lisa M Caputo
*Assistant Examiner*—Jermaine Jenkins
(74) *Attorney, Agent, or Firm*—Wenderoth, Lind & Ponack, L.L.P.

(57) ABSTRACT

It is aimed to provide a strain detector having a fewer number of mounting parts and high operation efficiency and usability. The strain detector is provided with a cylindrical strain generator to be strained upon receiving a load, a resistor element which is arranged on the outer circumferential surface of the strain generator and whose resistance varies depending on the amount of strain, a signal processing circuit connected with the resistor element and screw portions arranged above and below the strain generator to sandwich the strain generator. The strain generator and the screw portions are integrated.

12 Claims, 15 Drawing Sheets

U.S. PATENT DOCUMENTS

| | | | |
|---|---|---|---|
| 4,823,606 A * | 4/1989 | Malicki | 73/761 |
| 7,021,147 B1 * | 4/2006 | Subramanian et al. | 73/708 |
| 7,038,146 B2 * | 5/2006 | Saito et al. | 177/136 |
| 7,073,405 B2 * | 7/2006 | Rioux | 73/866.5 |
| 7,189,931 B2 * | 3/2007 | Hida et al. | 177/144 |
| 7,377,178 B2 * | 5/2008 | Kobayashi et al. | 73/761 |
| 7,555,960 B2 * | 7/2009 | Nakano et al. | 73/781 |
| 7,658,118 B2 * | 2/2010 | Yosiuti et al. | 73/862.044 |

FOREIGN PATENT DOCUMENTS

| | | |
|---|---|---|
| GB | 747692 | 4/1956 |
| JP | 47-41938 | 10/1972 |
| JP | 6-207865 | 7/1994 |
| JP | 11-241942 | 9/1999 |
| JP | 2003-240633 | 8/2003 |
| JP | 2007303914 A * | 11/2007 |

* cited by examiner

STRAIN DETECTOR HAVING A COLUMN-SHAPED STRAIN GENERATOR

TECHNICAL FIELD

The present invention relates to a strain detector for measuring a load acting on a vehicle seat or the like.

DESCRIPTION OF THE BACKGROUND ART

Hereinafter, a conventional strain detector is described.

A conventional strain detector includes a plate-like strain generator formed with a plurality of through holes, a resistor element arranged between the through holes of this strain generator and a signal processing circuit connected with the resistor element. A resistance of this resistor element varies depending on the amount of strain.

The load of a passenger sitting on a vehicle seat can be measured, for example, by mounting this strain detector between the vehicle seat and a floor surface portion. Specifically, the strain detector can be mounted by inserting a part of the vehicle seat into the inner one of the plurality of through holes formed in the strain generator to connect the strain generator and the vehicle seat, and inserting a part of the floor surface portion into the outer through hole to connect the strain generator and the floor surface portion. If the parts of the vehicle seat and the floor surface portion mentioned here are, for example, screw portions and are tightly fastened by nuts via the strain generator, the vehicle seat and the floor surface portion are connected. When a load acts on the vehicle seat, the resistance of the resistor element varies if the strain generator is strained. The load can be measured by processing this resistance variation in the signal processing circuit. In this case, since the strain generator is connected with both the vehicle seat and the floor surface portion, a load in a compression direction and a load in a tensile direction can be measured.

Some of such strain generators have cylindrical shapes besides plate-like shapes. Any of these is designed to mount a strain detector by combining a plurality of mounting parts.

Patent literatures 1, 2 are, for example, given as prior art literature information relating to the invention of this application.

Patent Literature 1:
  Japanese Unexamined Patent Publication No. 2003-240633

Patent Literature 2:
  Japanese Unexamined Patent Publication No. H06-207865

The above conventional strain detector requires a plurality of mounting parts in order to be mounted. Thus, the conventional strain detector had problems of poor assembling efficiency and poor usability.

DISCLOSURE OF THE INVENTION

In order to solve the above problems, an object of the present invention is to provide a strain detector having a fewer number of mounting parts and high operation efficiency and usability.

In order to accomplish the above object, the present invention is directed to a strain detector, comprising a tubular or column-shaped strain generator to be strained upon receiving a load; a resistor element which is arranged on a circumferential surface of the strain generator and whose resistance varies depending on the amount of strain; and screw portions arranged at the opposite axial sides of the strain generator in such a manner as to sandwich the strain generator, wherein the strain generator and the screw portions are integrated.

According to the present invention, the screw portions are so arranged in the axial direction of the strain generator as to sandwich the strain generator and the strain generator and the screw portions are integrated with each other. Thus, a seat and a floor surface portion can be easily mounted by being connected, for example, using these screw portions, and operation efficiency and usability can be improved.

BEST MODES FOR EMBODYING THE INVENTION

Hereinafter, best modes for embodying the present invention are described in detail with reference to the accompanying drawings.

First Embodiment

Figure 1:
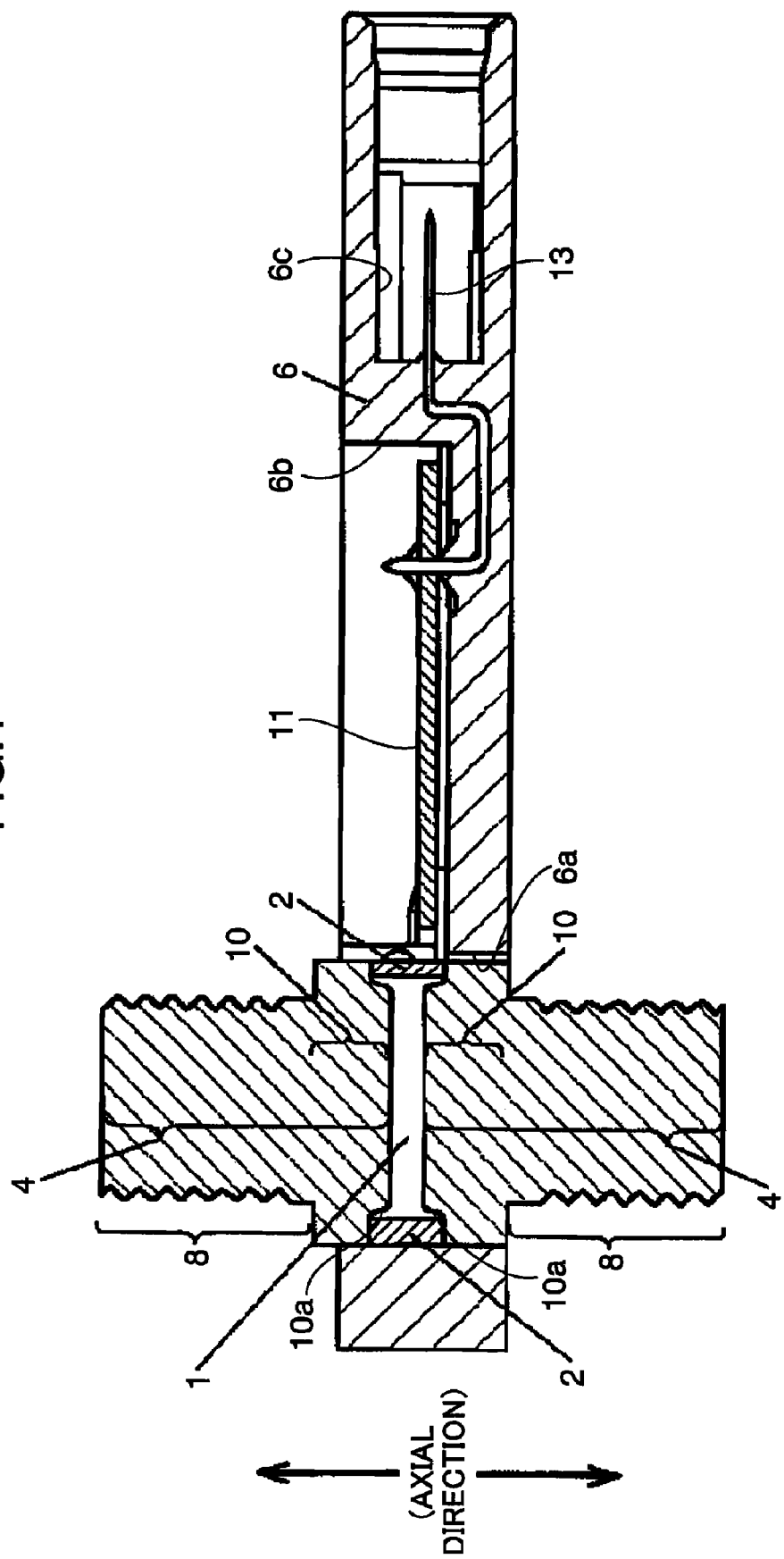
FIG. 1 is a section of a strain detector according to a first embodiment of the invention.
Figure 2:
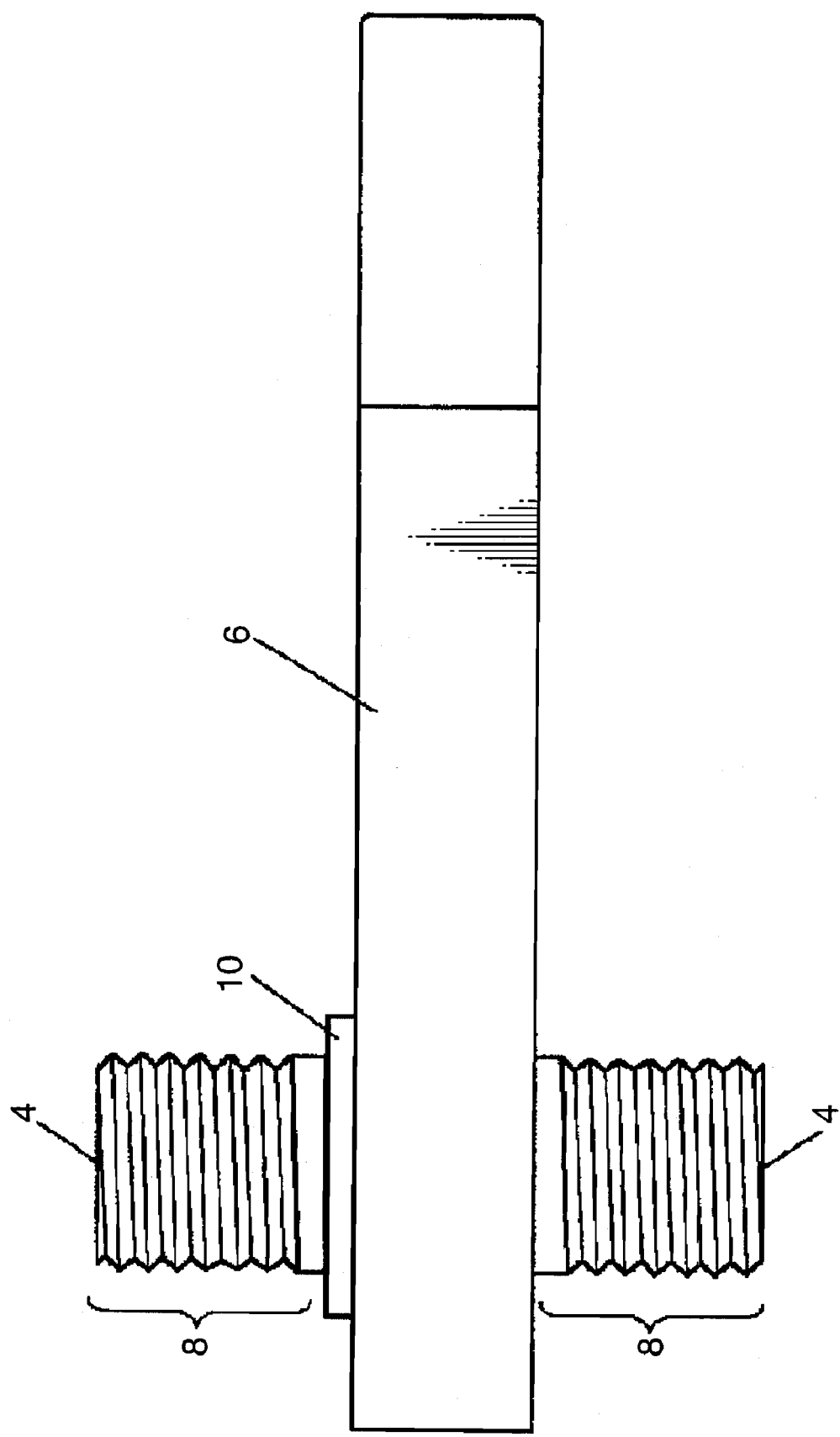
FIG. 2 is a side view of the strain detector.
Figure 3:
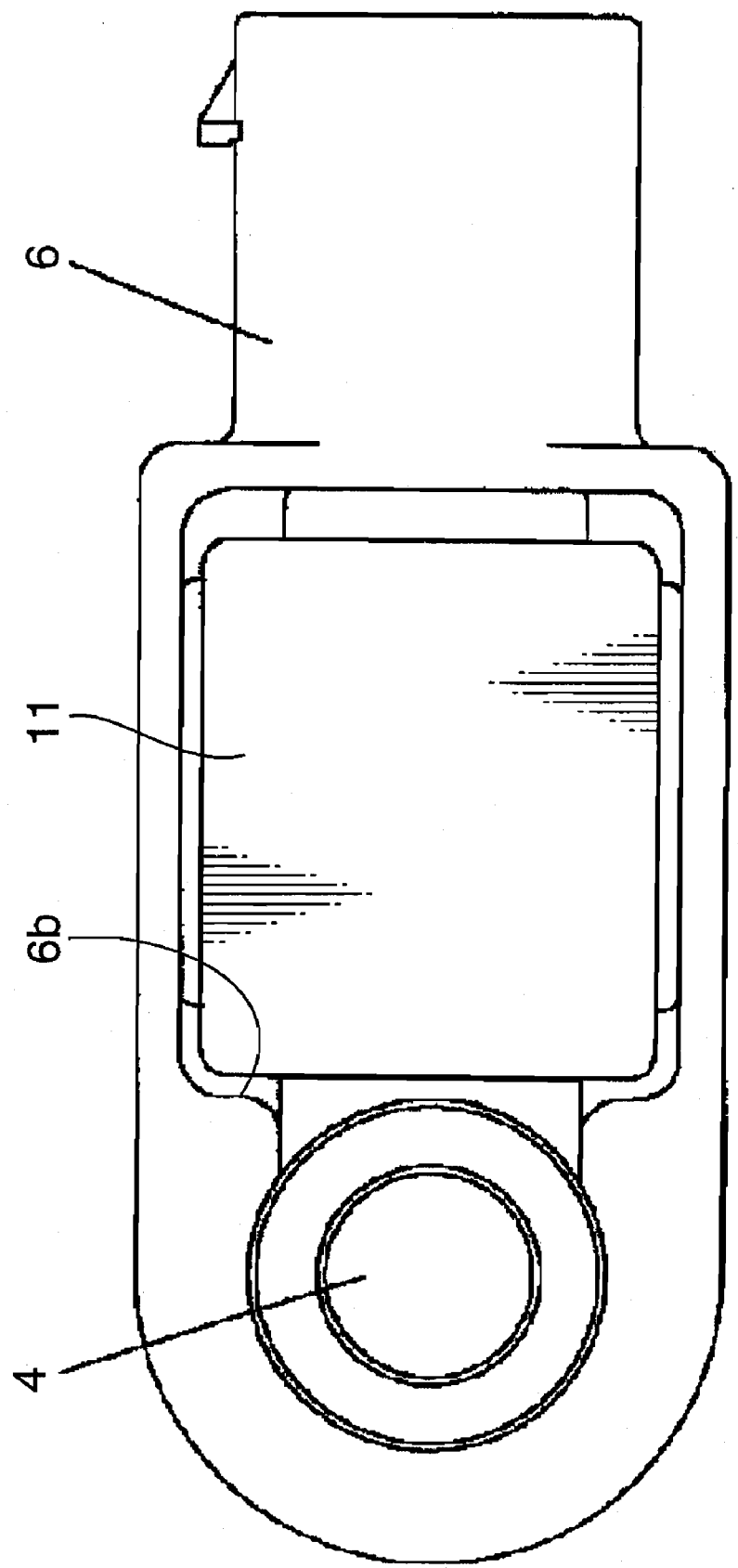
FIG. 3 is a top view of the strain detector.
Figure 4:
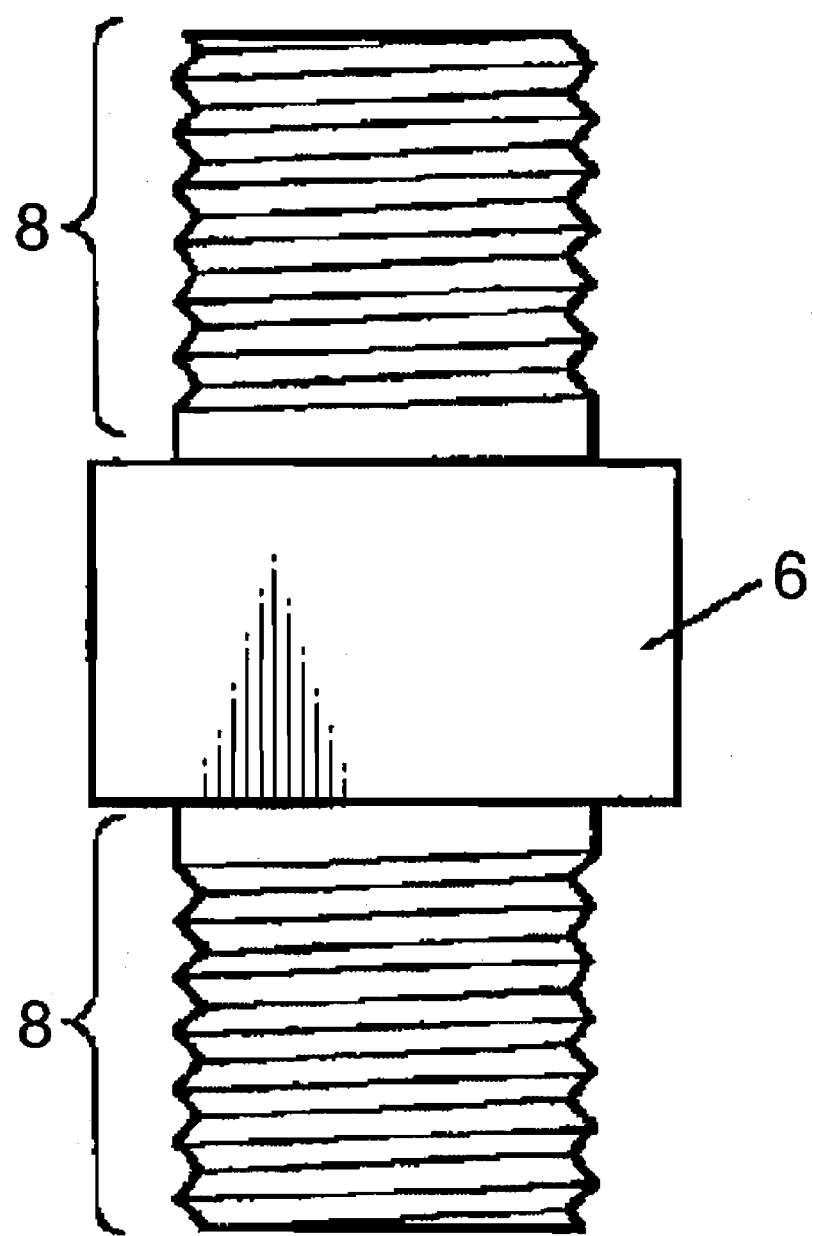
FIG. 4 is a front view of the strain detector.
Figure 5:
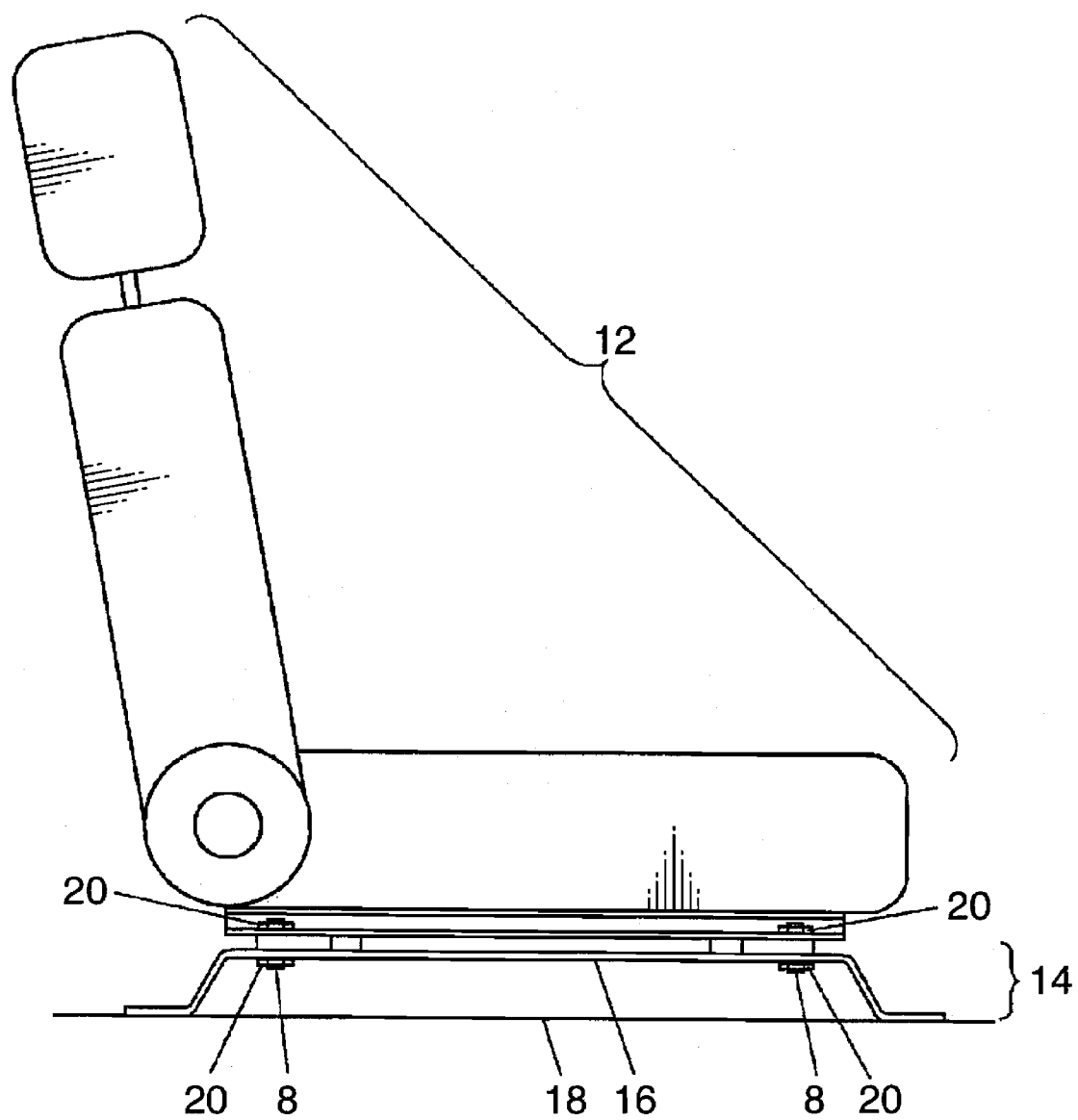
FIG. 5 is a side view of a seat unit in which a vehicle seat and a floor surface portion are connected using the strain detectors.

FIGS. 1 to 4 show a first embodiment of a strain detector according to the present invention. FIG. 1 is a section of a strain detector according to the first embodiment, FIG. 2 is a side view of the strain detector, FIG. 3 is a top view of the strain detector, and FIG. 4 is a front view of the strain detector. Further, FIG. 5 is a side view of a seat unit in which a vehicle seat and a floor surface portion are connected using the strain detectors.

As shown in FIGS. 1 to 4, the strain detector of this embodiment includes a column-shaped strain generator 2 to be strained upon the action of a load, a resistor element 7 (see FIG. 11) which is arranged on the outer circumferential surface of the strain generator 2 and whose resistance varies depending on the amount of the strain, and a signal processing circuit 11 for detecting the amount of strain of the strain generator 2 connected with the resistor element 7. This strain generator 2 has a tubular shape formed with a hollow space 1 in an axial direction. This hollow space 1 has a circular cross section. The strain generator 2 is so arranged that the axial direction thereof coincides with a load acting direction. It should be noted that the shape of the strain generator 2 is not limited to a hollow column shape, and may be a sold column shape.

The strain detector includes screw portions 4, 4 which are so arranged at the opposite axial sides as to sandwich the strain generator 2. The strain detector is installed such that the axial direction thereof is, for example, a vertical direction. Each screw portion 4 includes a screw shaft portion 8, which is an external thread, and a screw head portion 10 provided at an end of the screw shaft portion 8. The diameter of this screw head portion 10 is equal to that of the strain generator 2 and larger than that of the screw shaft portion 8. In other words, the screw head portion 10 is flange-shaped.

Figure 6:
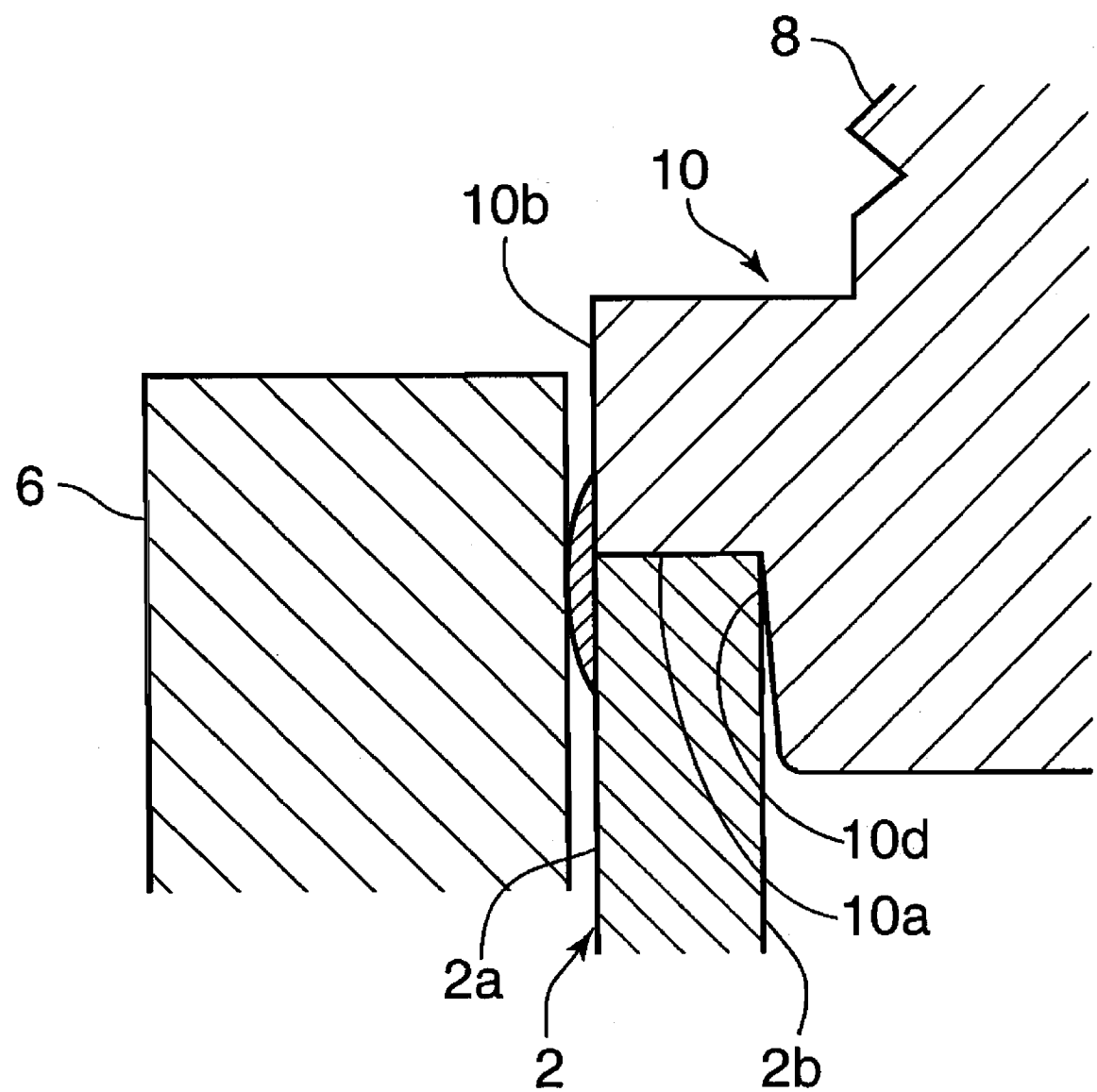
FIG. 6 is a section enlargedly showing a joint portion of a strain generator and a screw portion of the strain detector.

As enlargedly shown in FIG. 6, a recess 10a is formed in the outer circumferential part of the end of each screw head portion 10. This recess 10a is formed to have a specified width over the entire outer circumference. As a result, an inner circumferential part projects more than the outer circumferential part at the end of the screw head portion 10. The cylindrical strain generator 2 is engaged with these outer circumferential parts. Thus, the axial end surfaces of the strain generator 2 are held in contact with the bottom surfaces of the recesses 10a of the screw head portions 10. The bottom surfaces here mean surfaces of the recesses 10a parallel to the end surfaces of the screw head portions 10.

The strain generator 2 and the screw head portions 10 are joined with and welded to each other. Specifically, as shown in FIG. 6, an outer circumferential surface 2a of the strain generator 2 and an outer circumferential surface 10b of the screw head portion 10 are flush with each other, and the both members 2, 10 are welded over the entire circumferences of their outer circumferential surfaces 2a, 10b. Thus, the strain generator 2 and the screw head portions 10 are integrated. The shaft centers of the both screw shaft portions 8 coincide with that of the strain generator 2.

As shown in FIG. 1, the strain generator 2 is arranged in a casing 6. This casing 6 is in the form of a flat plate having a specified thickness and formed with a through hole 6a penetrating in a thickness direction. The strain generator 2 and the screw head portions 10 are inserted in this through hole 6a. In this state, the screw shaft portions 8 and parts of the screw head portions 10 project out of the casing 6. As also shown in FIG. 3, the casing 6 is formed with a rectangular recess 6b adjacent to the through hole 6a. The signal processing circuit 11 is arranged in this rectangular recess 6b. The strain generator 2 and the signal processing circuit 11 are electrically connected. A terminal 13 (see FIG. 1) is also connected with the signal processing circuit 11 and extends up to a connector recess 6c formed in a side surface of the casing 6.

A member for receiving a load (receiving portion) can be joined with one screw shaft portion 8, and a supporting portion for supporting the receiving portion can be joined with the other screw shaft portion 8. For example, in the case of using the strain detector to measure a load acting on a vehicle seat 12, the vehicle seat 12 as an example of the receiving portion may be joined with the one screw shaft portion 8 and a floor surface portion 14 of a vehicle as an example of the supporting portion may be joined with the other screw shaft portion 8 as shown in FIG. 5.

Specifically, through holes (not shown), into which the screw shaft portions 8 of the screw portions 4 are insertable, are formed in a bottom part of the vehicle seat 12. On the other hand, the floor surface portion 14 includes a rail portion 16 fixed to a floor surface 18, and this rail portion 16 are formed with through holes, into which the above screw shaft portions 8 are insertable. The respective through holes are formed such that the axial directions thereof are vertical to the floor surface 18. The one screw shaft portion 8 is inserted into the through hole of the vehicle seat 12, the other screw shaft portion 8 is inserted into the through hole of the rail portion 16, and nuts 20 are spirally engaged with the respective screw shaft portions 8. In this way, the vehicle seat 12 and the floor surface portion 14 are connected via the strain generators 2 and the screw portions 4.

When a load acts on the vehicle seat 12, this loads acts on the screw portions 4 such that a load acting direction is the axial direction (vertical direction) of the strain generator 2 and a middle part of the strain generator 2 bulges due to an axial force. Since the resistance of the resistor element 7 varies as the middle part of the strain generator 2 bulges, the load of a passenger sitting on the vehicle seat 12 can be measured by processing this resistance variation in the signal processing circuit 11.

Here, the strain detector is not merely sandwiched between the vehicle seat 12 and the floor surface 18. Specifically, the vehicle device 12 is fixed to one side of the strain detector, and the floor surface portion 14 is fixed to the other side of this strain detector. Thus, the strain detector is not merely sandwiched between the vehicle seat 12 and the floor surface portion 14. Accordingly, even if a load acts in such a direction as to move the vehicle seat 12 away from the floor surface portion 14, i.e. a load acts on the strain detector in a tensile direction, such a load can be measured.

Since a pair of screw portions 4 are formed to sandwich the strain generator 2 in this embodiment, the number of mounting parts is reduced and easy mounting is possible, for example, upon connecting the vehicle seat 12 and the floor surface portion 14 via the screw portions 4. As a result, operation efficiency and usability can be improved.

Further, since the signal processing circuit 11 is arranged in the casing 6 attached to the strain generator 2 or the screw portions 4, wire connection between the resistor element 7 and the signal processing circuit 11 can be shortened and sensitivity can be improved by being less subject to noise.

Furthermore, since the strain generator 2 and the screw portions 4 are integrated with each other, fractures at boundary portions between the strain generator 2 and the screw portions 4 can be suppressed even if a load acts on the vehicle seat 12. Particularly, fractures at boundary portions between the strain generator 2 and the screw portions 4 can be suppressed from several tens of kilograms at the time of weight detection to about 1 ton at the time of detecting a vehicle crash without impairing detection capability. Further, even against such loads of about several tons as to lead to the destruction of the vehicle, fractures at boundary portions between the strain generator 2 and the screw portions 4 can be suppressed.

In this embodiment, each screw portion is comprised of the screw head portion and the screw shaft portion and the strain generator and the screw head portions are welded to each other on the outer circumferential surfaces thereof. Thus, the strain generator 2 and the screw head portions 10 can be easily welded while avoiding the complicated shape of the screw head portions 10.

In this embodiment, each screw portion is comprised of the screw head portion and the screw shaft portion, the recesses are formed in the outer circumferential parts of the ends of the screw head portions, and the ends of the strain generator are arranged in the recesses. Since the ends of the strain generator 2 are arranged in the recesses 10a, the strain generator 2 and the screw portions 4 can be more easily joined.

It should be noted that the strain generator 2 and the screw portions 4 are not limited to those to be integrated by welding.

For example, the strain generator 2 and the screw portions 4 may be integrally formed by processing a member made of the same material. Austenitic steels having high ductility, toughness and weldability are preferably used as materials of the strain generator 2 and the screw portions 4. Specific examples include SUS301 having a work hardening property and SUS630 having a precipitation hardening property. Alternatively, ferritic steels having high corrosion resistance and weldability may also be used, and specific examples thereof include SUS430. The above SUS 301, SUS630, SUS430 are stainless steel standards defined by the JIS (Japanese Industrial Standards).

Since the strain generator 2 has a tubular shape having a through hole (hollow space 1) in its axial direction in this embodiment, a sufficient arrangement area for the resistor element 7 and a sufficient integration strength of the screw portions 4 and the strain generator 2 can be ensured by increasing the outer circumferential area of the strain generator 2 without impairing the easiness of the strain generator 2 to be strained. Specifically, if the strain generator 2 is a solid column, a stress is more unlikely to act on the strain generator 2 to decrease the sensitivity if the diameter of the strain generator 2 is increased to ensure a sufficient arrangement area for the resistor element 7. However, if the strain generator 2 is tubular as in the above construction, it is subject to stresses and a reduction in the sensitivity can be suppressed.

As shown in FIG. 6, the recess 10a of each screw head portion 10 includes a contact portion 10d to be held in contact with an inner circumferential surface 2b of the strain generator 2. This contact portion 10d may be, for example, formed to be held in surface contact with the inner circumferential surface 2b of the strain generator 2 or formed to be a slant to come into contact with an end of the inner circumferential surface 2b of the strain generator 2. By providing the recesses 10a of the screw head portions 10 with the contact portions 10d, the strain generator 2 and the screw portions 4 can be precisely and coaxially positioned. In this way, sensitivity can be improved by suppressing the bias of the strain of the strain generator 2 resulting from a displacement.

Figure 7:
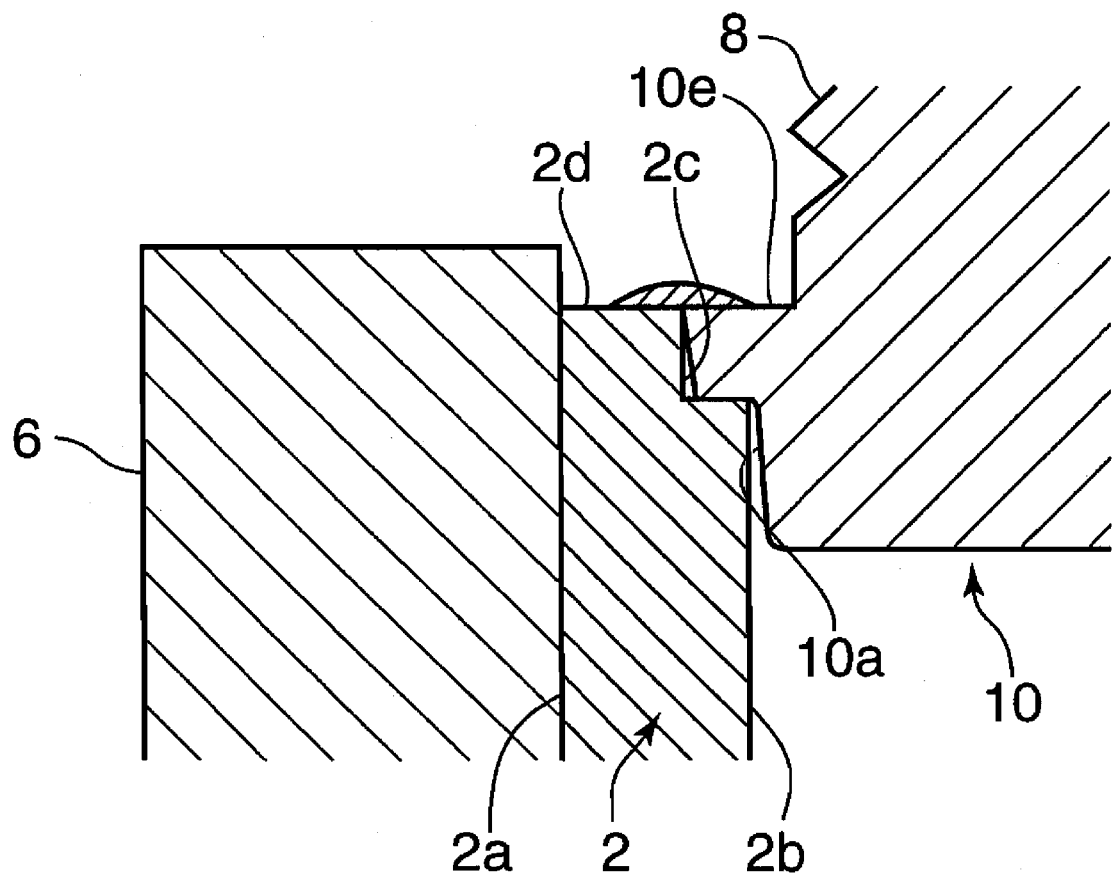
FIG. 7 is a section showing another joint mode of the strain generator and the screw portion.

It is also possible to weld the strain generator 2 and the screw head portions 10 at the axial end surfaces of the strain generator 2 as shown in FIG. 7. In this case, a stepped recess 2c is formed at a corner of the inner circumferential part of the strain generator 2. The stepped recess 2c and the recesses 10a are so arranged as to face each other, and the strain generator 2 and the screw head portions 10 are joined. An end surface 2d of the strain generator 2 and end surfaces 10e of the outer circumferential parts of the screw head portions 10 are flush with each other, and the strain generator 2 and the screw head portions 10 are welded over the entire circumference. In this construction, the axial length of the strain detector can be shortened.

Figure 8:
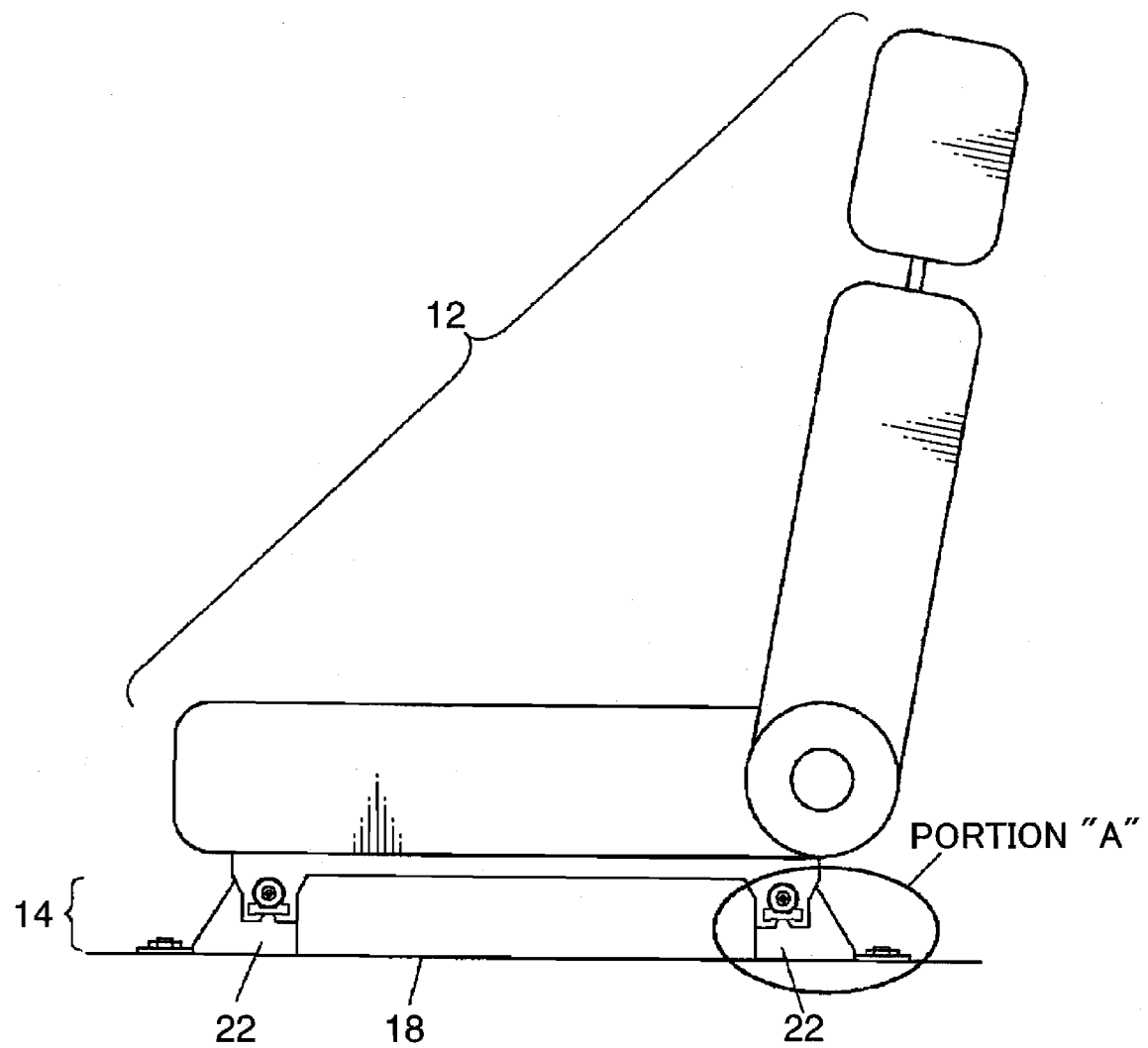
FIG. 8 is a side view of a seat unit of another mode.
Figure 9:
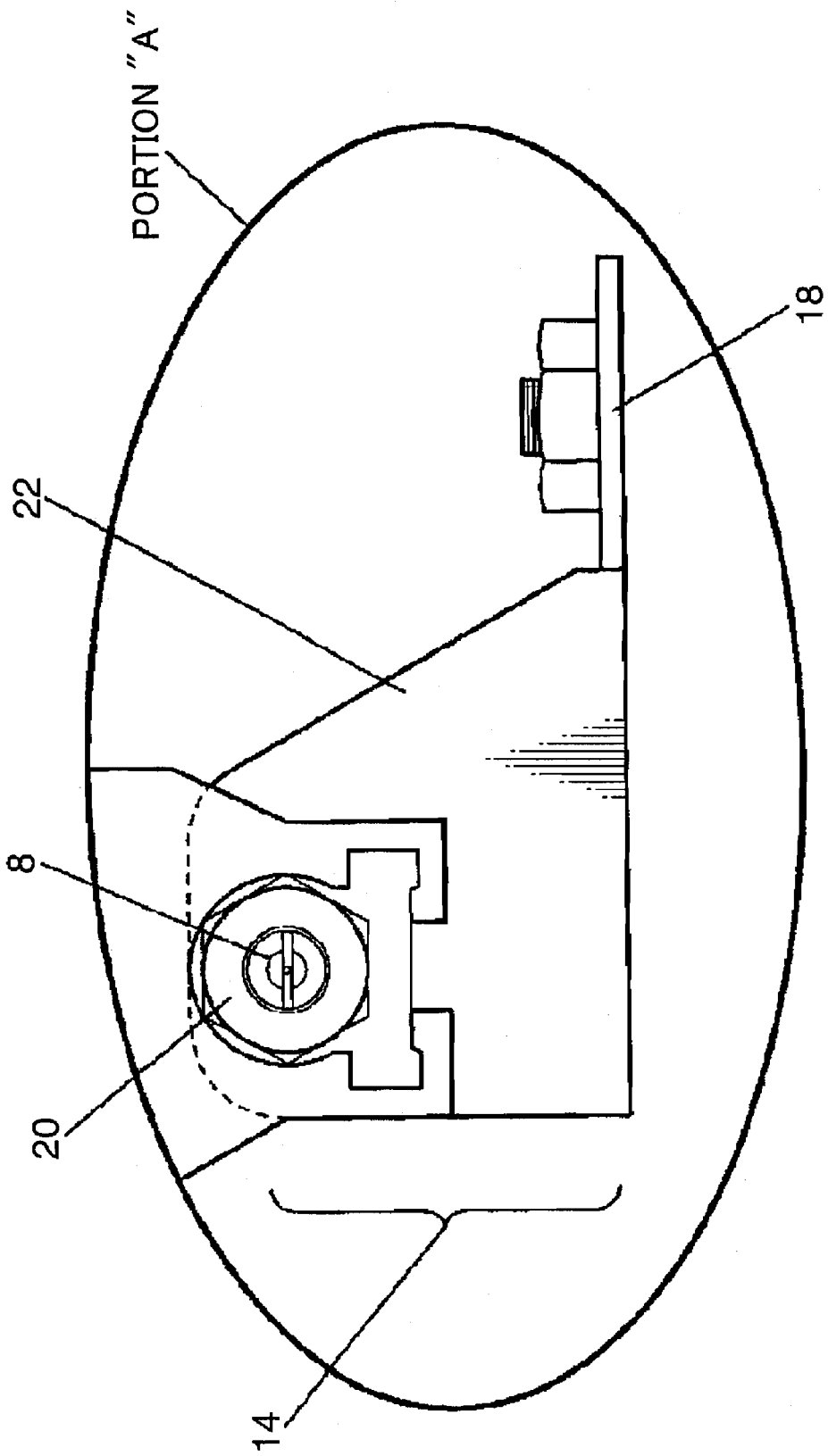
FIG. 9 is an enlarged view of a portion "A" of FIG. 8.
Figure 10:
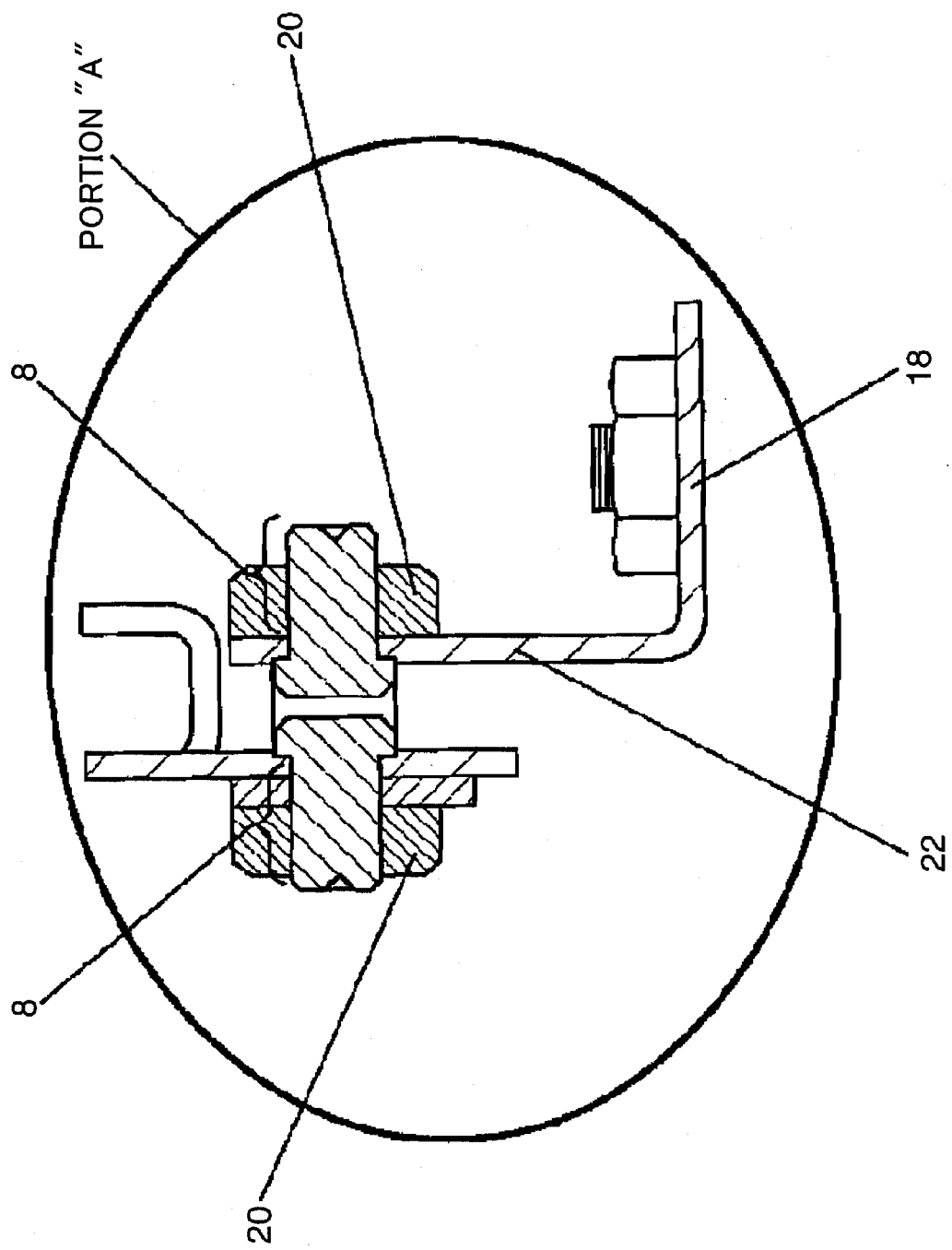
FIG. 10 is a front view in section of the portion "A" of FIG. 8.

The vehicle seat 12 and the floor surface portion 14 may be connected as shown in FIGS. 8 to 10. In this case, the vehicle seat 12 is formed in its bottom part with through holes, into which the screw shaft portions 8 of the screw portions 4 are insertable, and the floor surface portion 14 include supporting portions 22 fixed to the floor surface 18. The supporting portions 22 are formed with through holes, into which the screw shaft portions 8 are insertable, and the axial directions of the respective through holes are set to be horizontal with respect to the floor surface 18. The screw shaft portions 8 at one side are inserted into the through holes of the vehicle seat 12, the screw shaft portions 8 at the other side are inserted into the through holes of the supporting portions 22, and these screw shaft portions 8 are tightly fastened by the nuts 20, whereby the vehicle seat 12 and the floor surface portion 14 are connected via the strain generators 2 and the screw portions 4.

In this construction, when a load acts on the vehicle seat 12, this loads acts on the screw portions 4 such that a load acting direction is a direction perpendicular to the axial direction of the strain generator 2. Thus, the strain generator 2 is stained due to a shear force or a bending moment generated in the strain generator 2. Since the resistance of the resistor element 7 varies as the strain generator 2 is strained, the load can be measured by processing this resistance variation in the signal processing circuit 11.

Since the strain generator 2 is laterally arranged in this construction, an increase of the height of the strain detector can be avoided even if the axial length of the strain generator 2 increased depending on the specification. As a result, the height between the vehicle seat 12 and the floor surface portion 14 can be suppressed and the height of the seating surface of the vehicle seat 12, which differs depending on the vehicle type, can be set to a lower level. In other words, the eye line height of a passenger sitting on the seating surface can become easily adjustable.

Figure 11:
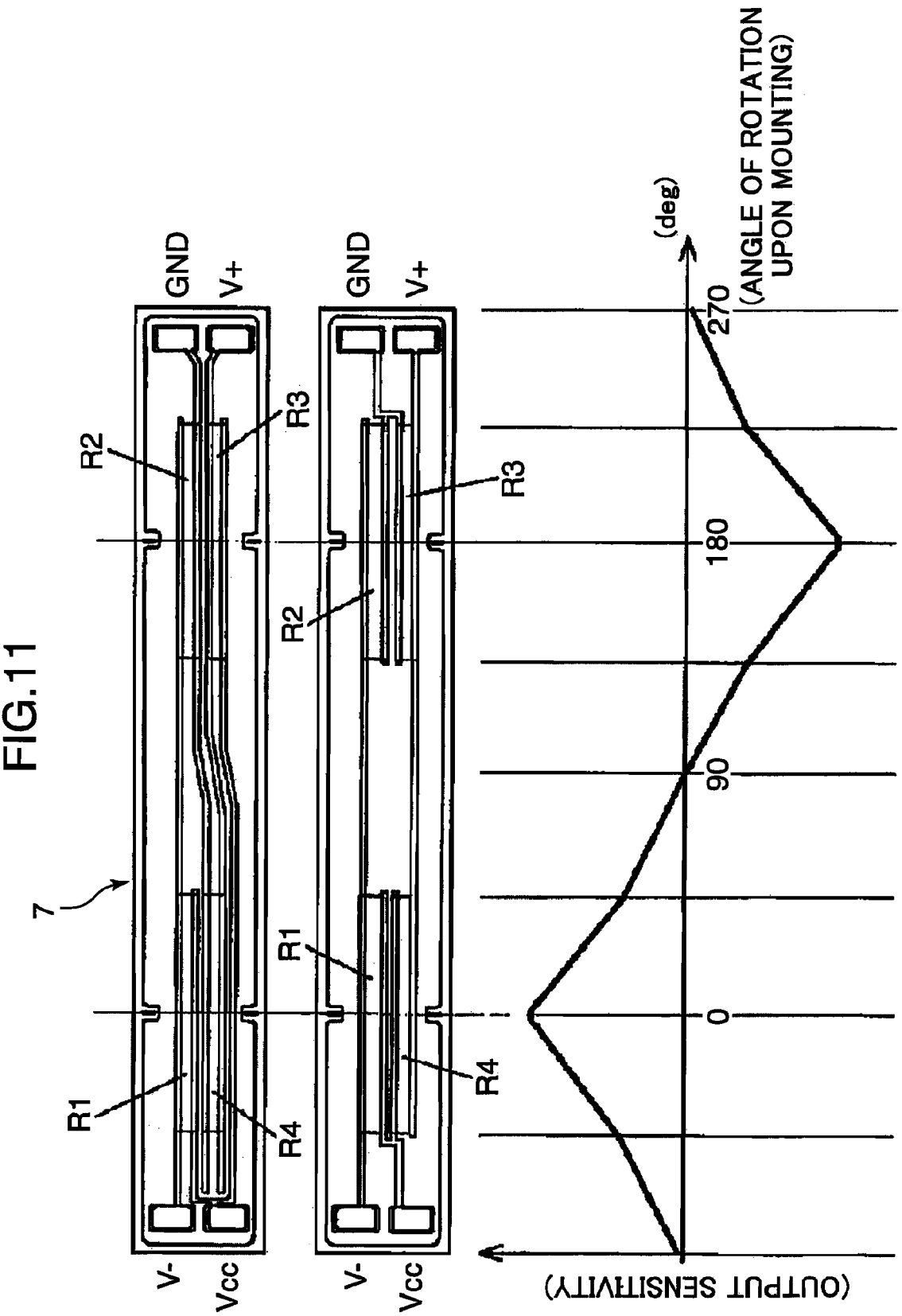
FIG. 11 is a characteristic graph showing a relationship between patterns and sensitivity of a resistor element.
Figure 12:
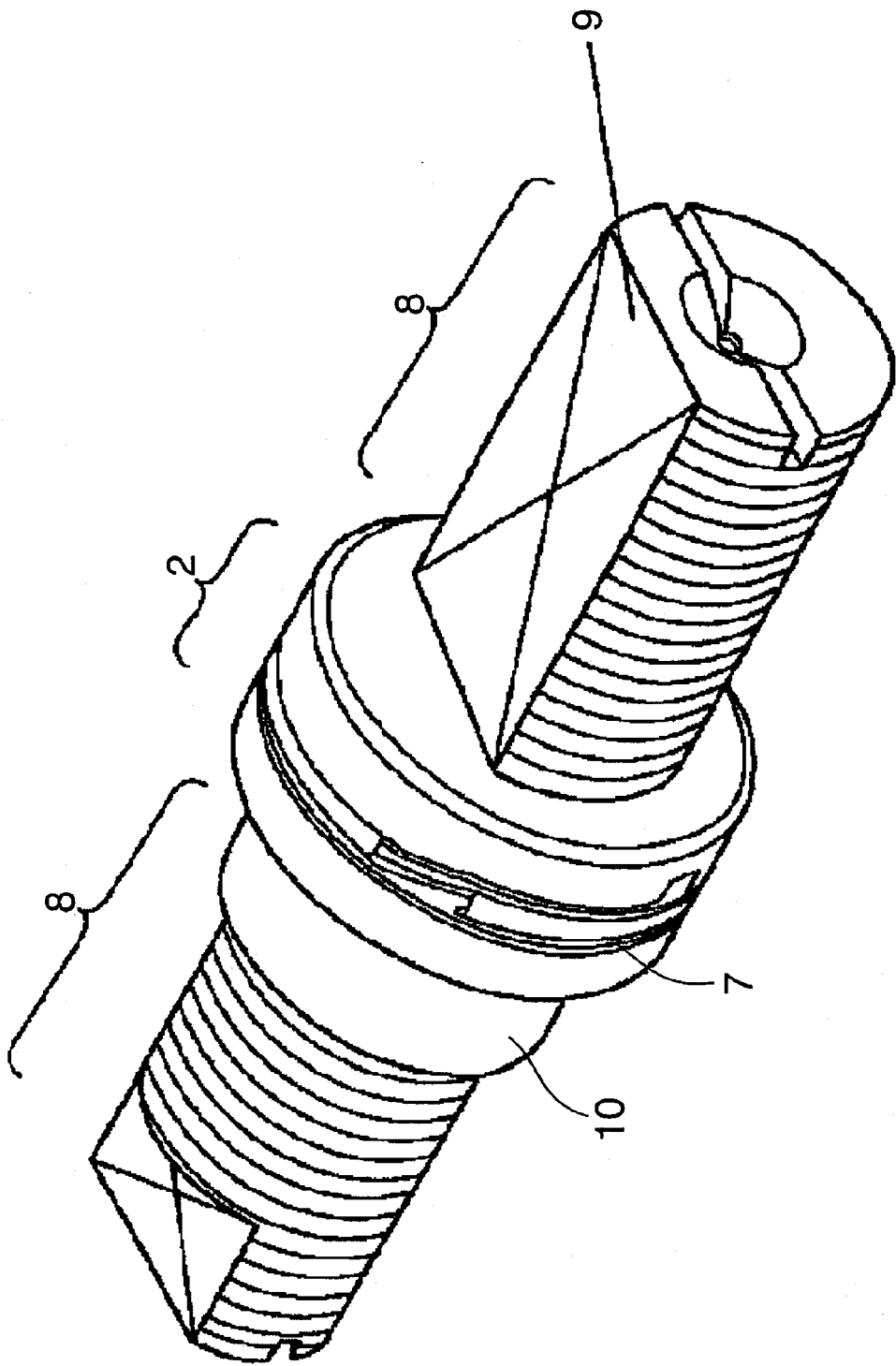
FIG. 12 is a perspective view showing screw portions and a strain generator used in a strain detector according to a second embodiment of the invention.

The resistor element 7 arranged in the strain generator 2 is wound around the outer circumferential surface of the strain generator 2. If being unfolded, this resistor element 7 becomes as shown in FIG. 11. FIG. 11 shows a relationship between patterns (unfolded patterns) and the output sensitivity of the resistor element 7. A specified output sensitivity corresponding to the strain of the strain generator 2 can be obtained by output voltages (V+) and (V−) connected between a power supply voltage (Vcc) and a ground electrode (GND) and patterns R1, R2, R3 and R4 of the resistor element 7. If the patterns R1, R4 and the patterns R2, R3 are so arranged as to face each other on the outer circumferential surface of the strain generator 2 and, for example, the patterns R1, R4 are arranged at a lower side of the strain generator 2 (angle of rotation is 0° upon the mounting) and the patterns R2, R3 are arranged at an upper side of the strain generator 2 (angle of rotation is 180° upon the mounting), the output sensitivity is maximized.

Second Embodiment

Next, a strain detector according to a second embodiment is described with reference to the drawings. In the strain detector of this second embodiment, the screw portions 4 in the strain detector of the first embodiment are modified.

In the strain detector of the second embodiment, a screw shaft portion 8 of each screw portion 4 is formed with a cutout 9. This cutout 9 is formed by cutting a part of the screw shaft portion 8 having a circular cross section by a plane parallel with a longitudinal axis. By providing the screw shaft portion 8 with the cutout 9, the rotation of the screw portion 4 at the time of fastening can be prevented. For example, in the case of connecting a vehicle seat 12 and a floor surface portion 14 with the screw portions 4, the vehicle seat 12 and the floor surface portion 14 are each formed with a through hole having a cross-sectional shape in conformity with the outer cross section of the screw shaft portion 28. If the screw shaft portions 8 are inserted into these through holes and tightly fastened by nuts 20 or the like, the screw portions 4 do not rotate relative to the vehicle seat 12 and the floor surface portion 14. Accordingly, the vehicle seat 12 and the floor surface portion 14 can be reliably mounted.

Figure 13:
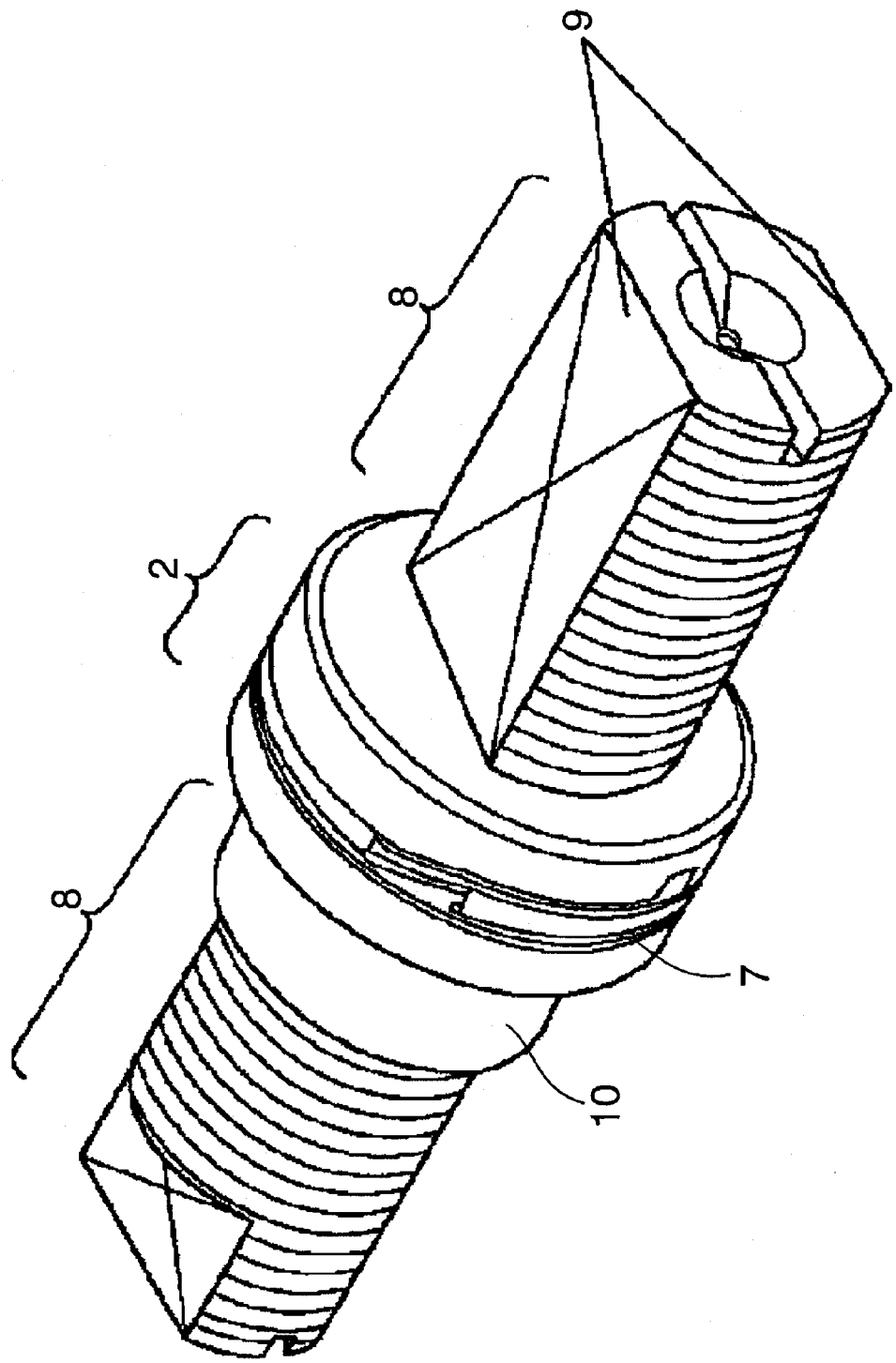
FIG. 13 is a perspective view of a screw portion of another mode.
Figure 14:
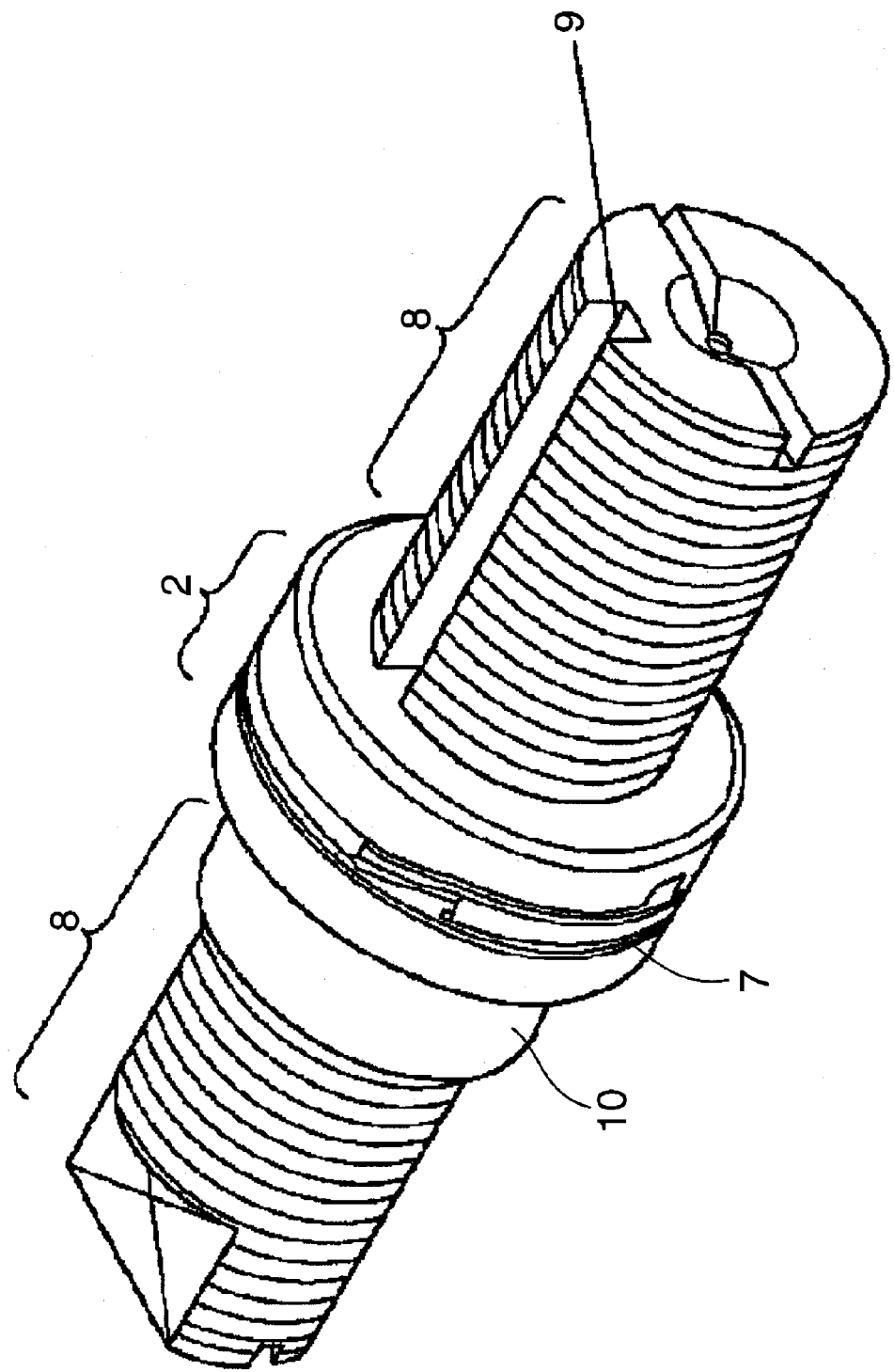
FIG. 14 is a perspective view of a screw portion of another mode.
Figure 15:
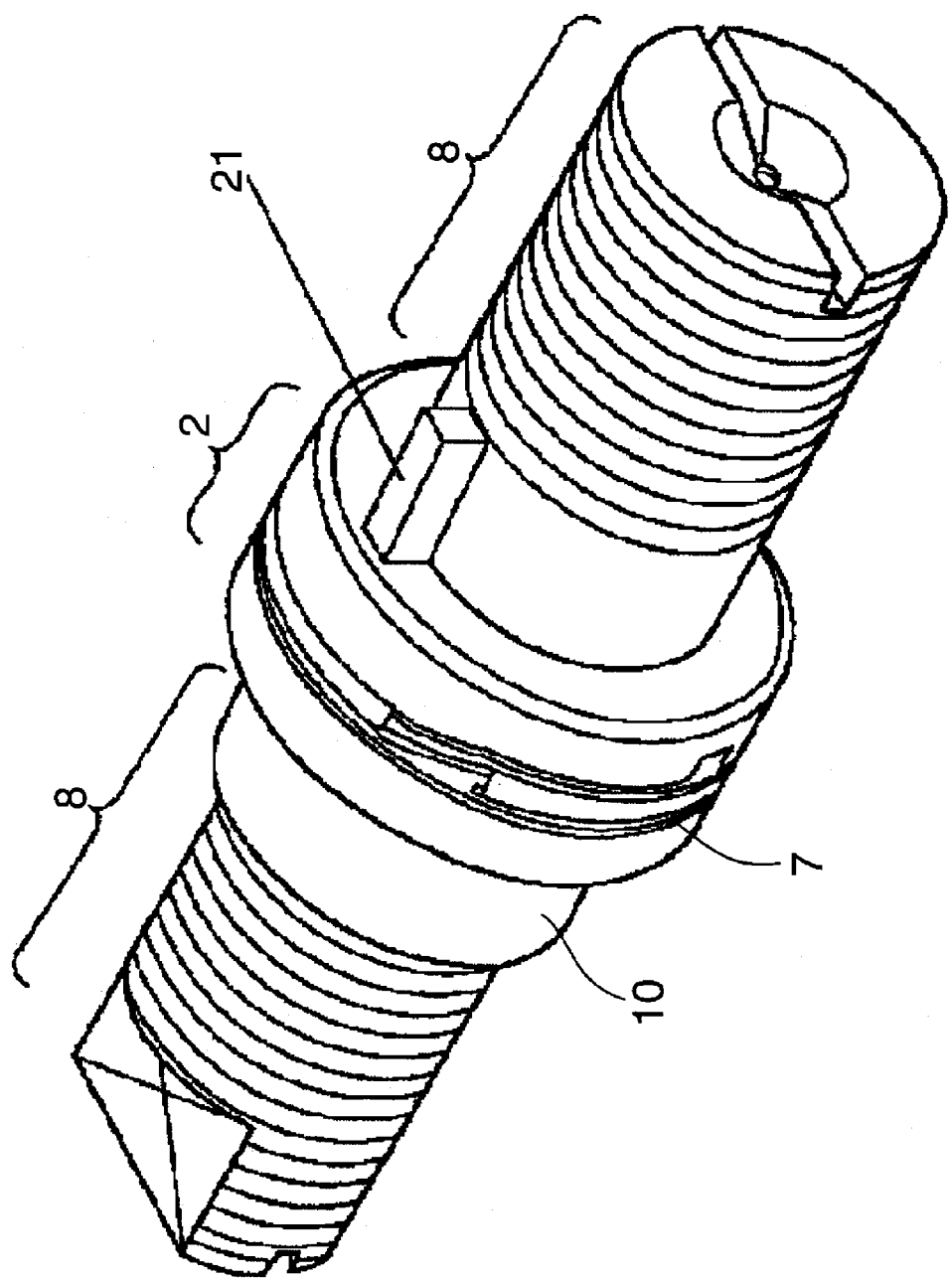
FIG. 15 is a perspective view of a screw portion of another mode.

Further, two cutouts 9 may be so formed in each screw shaft portion 8 of the screw portion 4 as to face each other as shown in FIG. 13 or a cutout 9 in the form of a groove extending in the longitudinal direction of the screw shaft portion 8 may be formed as shown in FIG. 14. Further, as shown in FIG. 15, the screw shaft portion 8 of the screw portion 4 may have a circular cross section and include a projection 21 extending in the longitudinal direction instead of having the circular cross section and including the cutout 9. The rotation of the screw portion 4 at the time of fastening by the nut 20 can also be prevented and the vehicle seat 12 and the floor surface portion 14 can also be reliably mounted by these constructions. Not the screw shaft portions 8, but the screw head portions 10 may be provided with these cutout 9 and projection 21.

Although the strain detector is used to measure a load acting on the vehicle seat 12 in the first and second embodiments of the present invention, it may be used for the measurement of a torque.

INDUSTRIAL APPLICABILITY

As described above, the strain detector according to the present invention is easily mountable and has high operation efficiency and usability by having a few number of mounting parts and, thus, is applicable to various apparatuses as a sensor for measuring a load.

What is claimed is:

1. A strain detector, comprising:
   a column-shaped strain generator to be strained upon receiving a load,
   a resistor element which is arranged around a circumferential surface of the column-shaped strain generator and whose resistance varies depending on an amount of strain, and
   screw portions sandwiching the column-shaped strain generator at opposite axial sides of the strain generator, the strain generator and the screw portions being integrated.

2. A strain detector according to claim 1, wherein the strain generator and the screw portions are integrated by welding.

3. A strain detector according to claim 2, wherein:
   each screw portion includes a screw head portion and a screw shaft portion, and
   the strain generator and the screw head portions are welded to each other on the outer circumferential surfaces thereof.

4. A strain detector according to claim 2, wherein:
   each screw portion includes a screw head portion and a screw shaft portion,
   a recess is formed at a corner of an outer circumferential part of each screw head portion while a recess is formed at a corner of an inner circumferential part of the strain generator, the screw head portions and the strain generator being so joined that these recesses face each other, and
the strain generator and the screw head portions are welded to each other at ends surfaces thereof.

5. A strain detector according to claim 1, wherein the strain generator has a tubular shape having a hollow space extending in an axial direction.

6. A strain detector according to claim 5, wherein:
   each screw portion includes a screw head portion and a screw shaft portion,
   a recess is formed in an outer circumferential part of an end of each screw head portion,
   and ends of the strain generator are arranged in the recesses.

7. A strain detector according to claim 6, wherein an inner circumferential surface of the strain generator is in contact with the recesses.

8. A strain detector according to claim 1, wherein a load acts in an axial direction of the strain generator via the screw portions, and the amount of strain resulting from an axial force of the strain generator is detected.

9. A strain detector according to claim 1, wherein a load acts in a direction perpendicular to an axial direction of the strain generator via the screw portions, and the amount of strain resulting from a shear force or bending moment of the strain generator is detected.

10. A strain detector according to claim 1, further comprising a signal processing circuit connected with the resistor element for detecting the amount of strain of the strain generator, wherein the signal processing circuit is arranged in a casing attached to the strain generator or the screw portions.

11. A strain detector according to claim 1, wherein:
    each screw portion includes a screw head portion and a screw shaft portion,
    the strain generator and the screw head portions are integrated, and
    either the screw head portions or the screw shaft portions or both of the screw head portions and the screw shaft portions have a circular shape having a cutout on the outer circumferential surface thereof.

12. A strain detector according to claim 1, wherein:
    each screw portion includes a screw head portion and a screw shaft portion,
    the strain generator and the screw head portions are integrated, and
    either the screw head portions or the screw shaft portions or both of the screw head portions and the screw shaft portions have a circular shape having a projection on the outer circumferential surface thereof.

* * * * *